Feb. 28, 1933.  J. J. DORSEY  1,899,319
AUXILIARY PROPULSIVE DEVICE FOR FISHING BOATS
Filed Nov. 16, 1931
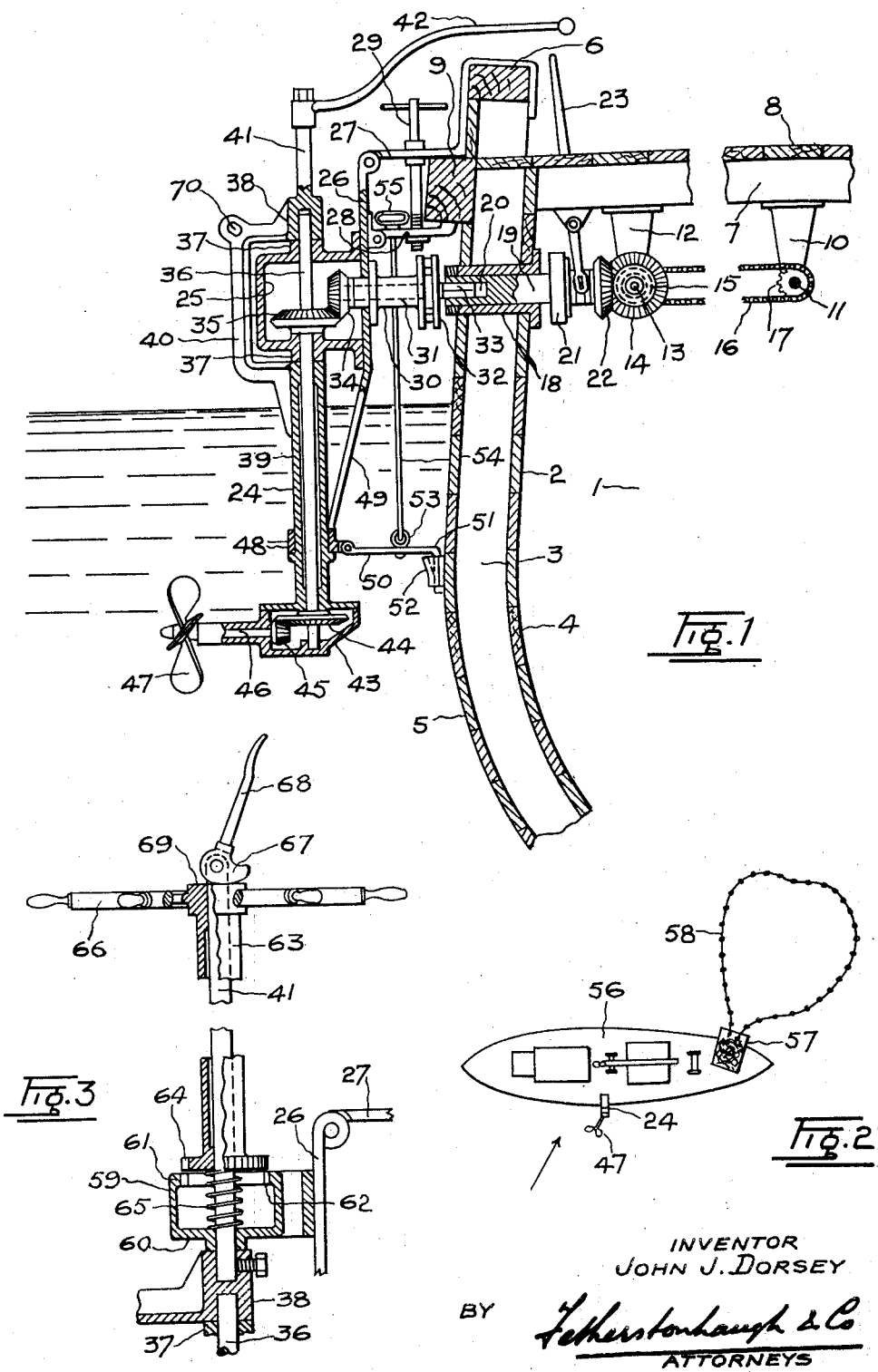
INVENTOR
JOHN J. DORSEY
BY
Featherstonhaugh & Co
ATTORNEYS Patented Feb. 28, 1933

1,899,319

UNITED STATES PATENT OFFICE

JOHN JAMES DORSEY, OF ECOOLE, BRITISH COLUMBIA, CANADA

AUXILIARY PROPULSIVE DEVICE FOR FISHING BOATS

Application filed November 16, 1931. Serial No. 575,373.

My invention relates to improvements in auxiliary propulsive devices for fishing boats. The objects of the invention are to provide means whereby a fishing boat, employing a purse seine net is capable of being manœuvred without having recourse to the regular propeller, whereby the boat may be kept head on to the seas, drawn away from shore or rocks, and kept clear of the seine net so that damage to the net, due to the rolling of the vessel, or any other cause usually prevalent in seine boats, as now generally equipped, is avoided.

The invention consists essentially of an auxiliary propeller or tractor screw capable of being detachably fitted to either side of the vessel and driven indirectly from the main engine, as will be more fully described in the following specification and shown in the accompanying drawing, in which:—

Fig. 1 is a sectional view of the invention showing it attached to the side of a seine boat.

Fig. 2 is a diagrammatic plan view of a seine boat and its net showing the manner in which the device would be used to bring the vessel head on to the sea subsequent to a sudden change of wind.

Fig. 3 is a sectional view of steering lock.

In the drawing like characters of reference indicate corresponding parts in each figure.

The numeral 1 indicates generally the hull of a fishing vessel having sides 2, consisting of ribs 3, inside planking 4, outside planking 5, a gunwale 6, deck beams 7, a deck 8 and a stringer 9. Journalled in suitable bearings 10 below the deck beams 7 is a winch shaft 11 driven through any suitable medium, such as chain, belt or bevel gears and vertical shaft from the vessel's engine, not shown.

Fitted adjacent one or both sides 2 of the vessel is a bearing 12 in which a shaft 13 is rotatably mounted. The shaft 13 is fitted with a mitre gear 14 and a sprocket wheel 15, shown in dotted line, which is driven by a chain 16 from a sprocket 17 keyed to the shaft 11.

A substantially watertight bearing 18 is fitted between the inner and outer side planking 4 and 5 respectively in which is journalled a hollow shaft 19 having a square core 20 extending inwardly from its outer end and provided at its inner end with a clutch 21, of any suitable type and a mitre gear 22 which is driven from the gear 14. The clutch 21 is controlled by a lever 23 extending through the deck 8 which enables the drive from the shaft 11 to be communicated to or disconnected from the shaft 19.

The numeral 24 indicates generally a propeller assembly, consisting of a housing 25 mounted upon a bracket 26, which latter is provided with a hinged upper clamp member 27 adapted to bear upon the stringer 9 and hook over the gunwale 6 of the boat and a lower hinged clamp member 28 which is adapted to be brought into gripping contact with the underside of the stringer 9 by a hand operated screw 29. The housing 25 is provided with a horizontal bearing 30 in which a shaft 31, shown in dotted line in Figure 1, is journalled. This shaft is fitted at its outer end with a flexible coupling 32 and a square shaft extension 33 which is adapted to fit the square core 20 of the shaft 19. The inner end of the shaft 31 is fitted with a bevelled pinion 34 which meshes with a further bevelled wheel 35 secured to a vertical shaft 36 journalled in vertical bearings 37. The shaft 36 extends upwardly into a bearing 38 and downwardly into a sleeve 39, both of which are connected together by a yoke 40 to rock upon the shaft 36 about the housing. Formed integrally with the bearing 38 and extending thereabove is a stem 41 to which a tiller 42 is attached.

At the lower end of the sleeve 39 a further housing 43 is fixed which encloses a bevel gear 44 keyed to the vertical shaft 36, and a pinion 45, fitted upon a horizontal shaft 46, meshing therewith, the outer end of the shaft 46 is fitted with a propeller or tractor screw 47. A collar 48 is fitted about the sleeve 39 which is secured to the housing 25 with a rod 49 and has hingedly connected to it a stay bracket 50. The stay bracket 50 is downwardly turned at its outer end as at 51 and is adapted to enter a socket 52 secured to the outer planking 5 below the water line. An eye 53 is mounted intermediate the length of the bracket 50 which is attached to a rod 54 having a handle 55 at its upper end, the upper end of the rod being suitably supported by being passed through an aperture in the lower clamping member 28.

In the diagram shown in Figure 2, a seine boat indicated by the numeral 56 is fitted with a turntable 57 from which a purse seine net 58 is operated.

In the steering lock shown in Figure 3, the stem 41 is preferably square in cross section and passes through a box-like structure 59 which is non-rotatably secured to the bracket 26. The structure 59 is provided with a bottom wall 60 in which the stem is journalled and a top wall 61 having a concentric opening in the form of an internal gear 62. Slidably and non-rotatably mounted upon the stem is a sleeve 63 having at its base a gear 64 which is adapted to slidably engage the internal gear 62 and to be normally held out of engagement therewith by a compression spring 65 surrounding the base of the stem. The upper end of the sleeve 63 is fitted with a horizontal steering wheel 66 by which the sleeve and the stem are turned.

To the upper extremity of the stem a forked cam 67 having a normally upstanding lever 68 is pivotally mounted which cam is adapted to bear upon the hub 69 of the steering wheel 66. The sleeve 63 is normally in elevated position as shown and when in such position the wheel can be freely turned to dispose the propeller 47 to drive the vessel in any desired direction, but when it is desired to lock the wheel, it suffices to depress the lever 68 which rocks the cam 67 and forces the gear 65 into locking engagement with the internal gear 62.

In operation, one end of the net is paid out from the turntable 57 and is secured to a skiff in charge of one man. The boat 56 continues to pay out the net over the stern while travelling, using its regular propeller, over a substantially circular course back to starting point, where the purse line of the net is taken on board and hauled in to purse up the bottom of the net and entrap fish. When this is done the net is progressively drawn inboard onto the turntable. During the time that the net is entirely out, or is being drawn in, it is not safe to use the main propeller to manoeuvre the boat on account of the danger of the propeller getting entangled in the net and if circumstances such as wind or tide tend to drive the boat onto the net difficulty would be experienced in hauling in the net, difficulty is also caused by the broaching to of the boat causing it to roll and damage the fish loaded net, so in order to avoid any of these difficulties the clutch 21 is "let in" by operating the lever 23 to communicate a drive from the overhead shaft 11 through the shafts 18, 31 and 33 and the gears 34 and 35, thence through the shaft 36 and the gears 44 and 45 to drive the tractor screw 47 which is turned outwards from the hull of the boat by means of the tiller 42 to draw the boat head on to the seas and away from the net, thus keeping the net well clear of the hull and the main propeller and enabling it to be hauled in and stowed away upon the turntable 57 without difficulty.

When fishing operations are over, the rod 54 is raised to disconnect the downwardly turned hook member 51 of the stay bracket 50 from its socket 52, the screw 29 is slackened off to release the grip of the clamping members 27 and 28 from the stringer and a hoisting tackle is attached to an eye 70 in the yoke 40 and the propeller assembly is then swung about the hinge of the upper clamping member 27 until the shaft 33 is withdrawn from the core of the shaft 19 and is then raised bodily and swung inboard, thus leaving the boat free to be driven by its regular propeller.

What I claim as my invention is:

1. In an auxiliary propulsion device of the class described having a rotatable sleeve enclosing a driven shaft, a stationary support concentric with the shaft, a steering member secured to the sleeve to turn it, and means associated with the steering member adapted to engage the support to lock the steering member against rotation.

2. In an auxiliary propulsion device of the class described having a rotatable sleeve enclosing a driven shaft, a stationary support concentric with the shaft, a steering member secured to the sleeve to turn it, a stem extending upwardly from the support, a rotating sleeve slidably mounted upon the stem supporting the steering member, normally separated complemental locking members upon the support and the slidably mounted sleeve, and means for sliding the slidably mounted sleeve toward the support to engage the complemental locking members.

3. In an auxiliary propulsion device of the class described having a rotatable sleeve enclosing a driven shaft, a stationary support concentric with the shaft, a steering member secured to the sleeve to turn it, a stem extending upwardly from the support, a rotating sleeve slidably mounted upon the stem supporting the steering member, normally separated complemental locking members upon the support and the slidably mounted sleeve, and means for sliding the slidably mounted sleeve toward the support to engage the complemental locking members, said means comprising a cam pivotally connected to the upper extremity of the stem adapted to engage the slidably mounted end of the sleeve to depress it.

Dated at Kildonan, B. C., this 9th day of October 1931.

JOHN JAMES DORSEY.